Jan. 26, 1971     H. R. HILL ET AL     3,557,569
PORTABLE CARGO SYSTEM
Filed Oct. 8, 1968
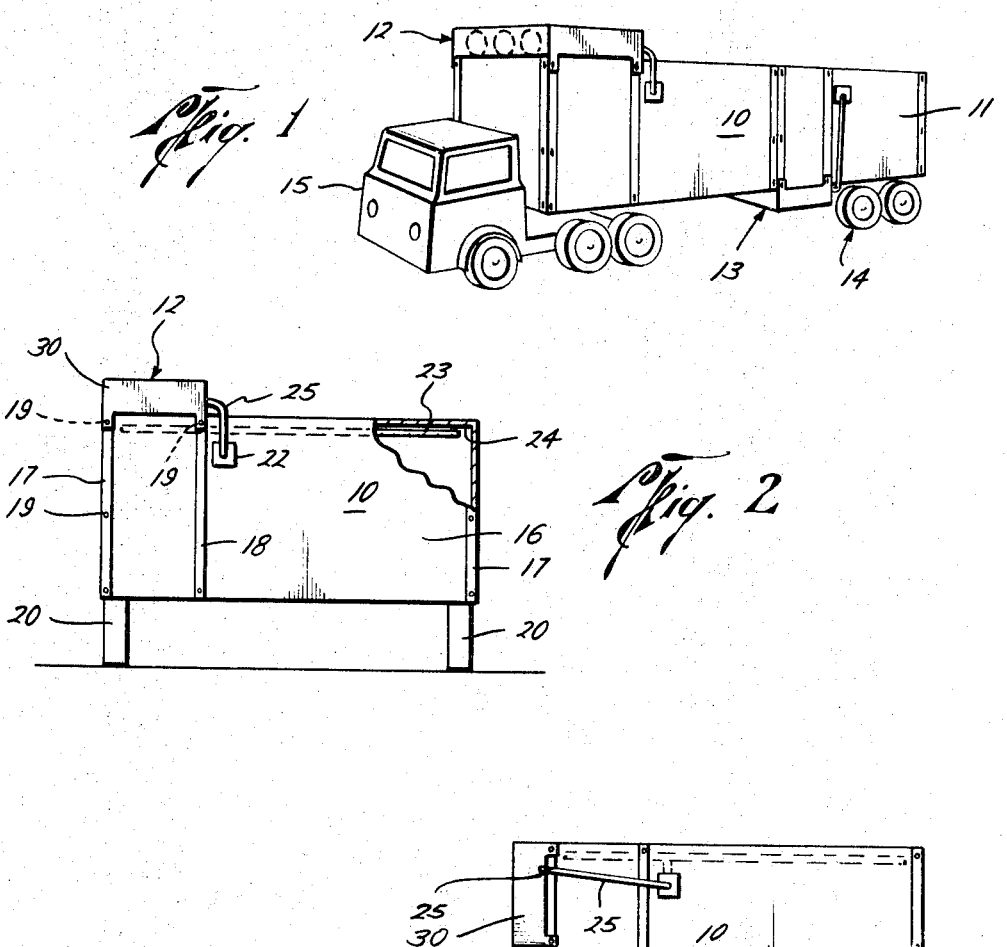
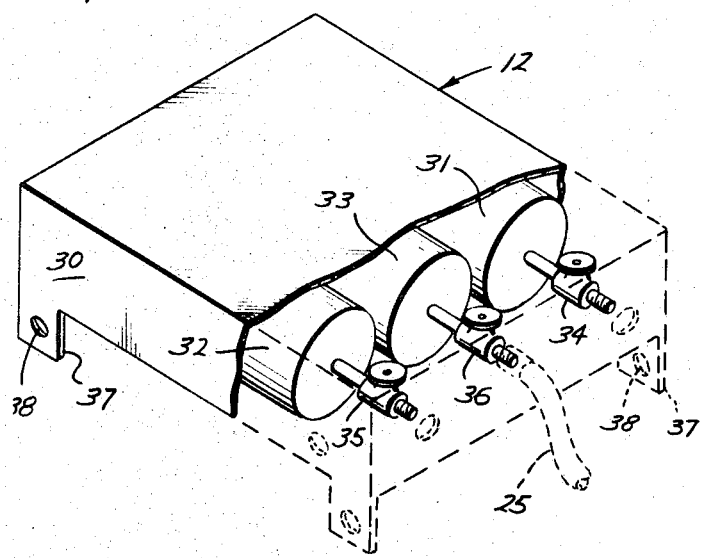
Holbert R. Hill
Garfield C. Siverson
INVENTORS
BY
Hayden Pravel Wilson & Matthews
ATTORNEYS

United States Patent Office 3,557,569
Patented Jan. 26, 1971

3,557,569
PORTABLE CARGO SYSTEM
Holbert R. Hill and Garfield C. Siverson, both of
3112 Produce Row, Houston, Tex. 77023
Filed Oct. 8, 1968, Ser. No. 765,922
Int. Cl. F25d 15/00
U.S. Cl. 62—237                                      1 Claim

ABSTRACT OF THE DISCLOSURE

A portable cargo container for handling either perishable or non-perishable goods and adapted to have a portable coolant supply mounted thereon for refrigerating the goods when they are of a perishable nature. Two or more of these portable cargo containers may be used to provide a unitary trailer unit.

BACKGROUND OF THE INVENTION

This invention relates to cargo carrying equipment for perishable and non-perishable goods.

When transporting various types of commodities, such as foodstuffs, from one place to another, it is frequently necessary to keep such commodities under refrigeration. This is presently done by using refrigerated trucks, truck trailers, railroad cars and the like. Present-day methods, however, suffer from certain disadvantages in many instances.

Consider, for example, the case of a refrigerated trailer truck which is required to pick up a load of perishable goods. In this case, it is necessary for both the truck and the driver to sit and wait while the goods are being loaded. In some cases, this can be done in a few hours time. In other cases, however, it may take as much as a day or more. Such would be the case where the truck is at a farm site for purposes of loading farm produce as it is picked. In either case, this is wasteful of the truck driver's time and the usage time of a relatively expensive refrigerated truck.

A similar type of situation occurs when delivering refrigerated goods to the consignee. The truck and driver are required to remain idle while the goods are being unloaded.

A further disadvantage occurs at the delivery end when the truck is carrying several intermingled "less than truck load" orders. In such case, because of the intermingling, it may be necessary for the truck to make more than one trip to the same consignee's place of business before the truck is completely unloaded. This problem is rather common in connection with the delivery of foodstuffs.

From the consignee's point of view, on the other hand, his operations could frequently be simplified if the truck could be allowed to remain at his place of business for an extended period of time so that his personnel could unload it at their convenience. This would be particularly helpful where the consignee is, at that moment, suffering from a shortage of storage space in his refrigeration facilities.

Another problem for truckers who handle both refrigerated and non-refrigerated cargoes is that from time to time they may have only the wrong kind of equipment on hand for purposes of delivering a particular cargo. Sometimes, they will have only refrigerated units on hand when it is desired to tranport goods which do not require refrigeration and vice versa. It is, of course, not economically desirable to carry non-refrigerated goods by means of trucks and trailers which are equipped with refrigeration equipment.

SUMMARY OF THE INVENTION

It is an object of the invention, therefore, to provide a new and improved cargo unit which is readily portable by truck, trailer, railroad, boat or other means and which may be left unattended at a desired place of loading or delivery and which may be used with either refrigerated or non-refrigerated goods.

It is another object of the invention to provide a new and improved portable cargo container which may be readily and quickly converted from a non-refrigerated container to a refrigerated container and vice versa.

It is a further object of the invention to provide new and improved portable cargo containers and detachable refrigeration units which may be combined in various combinations to provide a larger overall transportation unit.

In accordance with one feature of the invention, a portable cargo system comprises a portable cargo container for enclosing the goods to be transported. Such system further includes an intake control assembly mounted on the cargo container and adapted for releasable coupling with an external portable fluid coolant supply. Such system further includes conduit means located inside of the cargo container and coupled to the intake control assembly for releasing coolant fluid into the interior of the cargo container when transporting perishable goods.

In accordance with another feature of the invention, a plurality of these portable cargo containers may be combined in a detachable manner to provide a unitary truck or trailer unit. One, some or all of these portable cargo containers which are so combined may be provided with its own individual portable coolant supply for enabling coolant fluid to be released into the interior of such container.

For a better understanding of the present invention, together with other and further objects and features thereof, reference is had to the following description taken in connection with the accompanying drawing, the scope of the invention being pointed out in the appended claim.

BRIEF DESCRIPTION OF THE DRAWING

Referring to the drawing:

FIG. 1 is a perspective view of a tractor-trailer embodiment of a portable cargo system constructed in accordance with the present invention;

FIG. 2 is a partially cut away side elevational view of one of the portable cargo containers of FIG. 1 as it might be left standing at a place of loading or delivery;

FIG. 3 is an enlarged, partially cut away perspective view of one of the detachable refrigeration units of FIG. 1; and FIG. 4 shows an alternative manner of securing a detachable refrigeration unit to the portable cargo container.

DESCRIPTION OF THE PREFERRED EMBODIMENT

Referring now to FIG. 1, there is shown a tractor-trailer embodiment of a portable cargo system constructed in accordance with the present invention. This system includes a plurality of portable sealed cargo containers, generally indicated at 10 and 11, for individually enclosing different cargos. These cargos may include such goods as canned items, perishables and the like which are required to be kept under refrigeration or in a frozen state. Detachable refrigeration units or coolant supply units 12 and 13 are individually attached to the portable cargo containers 10 and 11, respectively, for keeping the items contained therein under refrigeration. The coolant supply unit 12 is attached to the top of the first portable cargo container 10, while the coolant supply unit 13 is supported below the second cargo container 11.

The portable cargo containers 10 and 11 are detachably mounted on a trailer chassis (not shown) having a bogie wheel unit 14. The trailer chassis is of the type which includes a hydraulic lifting mechanism (not shown) for enabling the trailer cargo, in this case, the portable containers 10 and 11, to be elevated a short distance so that such cargo might be left standing completely unattended at a desired place of loading or delivery. The trailer chassis is pulled by a motorized tractor unit 15.

While only two portable cargo containers have been illustrated in FIG. 1, in many cases, it will be more desirable to use a larger number of units which may vary in length from ten to forty feet.

Referring to FIG. 2, there is shown an elevational view of one of the portable cargo containers of the FIG. 1 system, which is illustrated as being the forward cargo container 10. FIG. 2 shows the cargo container 10 as it might be left standing at a place of loading or delivery. As there seen, the cargo container 10 includes a portable, sealable cargo housing 16 for enclosing the cargo to be transported. This cargo housing 16 is of a rectangular airtight type of construction and, as such, may be constructed in the same general manner as are the van portions of conventional van-type truck trailers. The cargo housing 16 is provided with a set of doors (not shown) for purposes of unloading the cargo. The four corners of the cargo housing 16 are reinforced by vertical frame members 17. An additional vertical frame member 18 is secured to the housing 16 on each side thereof a short distance rearward from the front end of the cargo housing 16. These vertical frame members 17 and 18 are provided with fittings or sockets 19 which are adapted to receive handling elements or lifting devices for handling the cargo container 10.

When left in a freestanding condition as shown in FIG. 2, the cargo container 10 is supported by a set of four detachable leg members 20, these being located at the four corners of the cargo container 10. When the cargo container 10 is being transported from one place to another, these detachable legs 20 may be stored by attaching them or stowing them in some convenient manner to the underside of the container 10 or to the trailer chassis.

The portable cargo system being considered also includes an intake control assembly 22 permanently mounted on the cargo container 10. This assembly 22 includes an intake pipe which extends through the side wall of the container housing 16. This control assembly 22 includes a suitable means for releasably coupling a hose or flexible pipe to the exterior end of the intake pipe. Located inside of the cargo housing 16 is a fluid conduit means 23 which may take the form of an elongated metal pipe 23. The conduit means 23 is either attached to or supported from the ceiling 24 of the cargo housing 16 and extends longitudinally from the front to the rear of the housing 16 for most of the length of such housing. The conduit 23 is perforated or provided with a plurality of small openings along the length thereof for purposes of releasing coolant fluid into the interior of the cargo housing 16. It is to be understood that when the coolant fluid is released into the interior of the housing 16 that the fluid is converted to gas for freezing or cooling the goods inside of the housing 16. The conduit 23 is connected by way of a short coupling conduit to the interior end of the intake pipe associated with the control assembly 22.

As will be seen, the detachable refrigeration unit or coolant supply unit 12 includes a plurality of cylinders or bottles of coolant fluid. One of these bottles is connected by way of a hose or flexible pipe 25 to the exterior end of the intake pipe associated with the intake control assembly 22.

Referring to FIG. 3, there is shown an enlarged, partially cut away view of the detachable coolant supply unit 12. As there seen, the detachable unit 12 comprises a coolant supply container 30 having a plurality of coolant fluid bottles 31–33 located therein. These bottles 31–33 are provided with shutoff valves 34–36, respectively. As indicated in the illustrated example, the outlet of the coolant bottle 33 is connected to the hose 25 running from the intake control assembly 22 of the cargo container 10. The coolant fluid or cyrogenic fluid contained under pressure in the bottles 31–33 may be, for example, either liquid freon or liquid nitrogen. It must be a substance which is both non-toxic and non-corrosive so as not to damage the cargo being transported.

For purposes of attaching the coolant supply container 30 to the housing 16 of the cargo container 10, the coolant supply container 30 includes a plurality of extended coupling members 37, each of which is provided with a passage or hole 38 for a retainer pin. As indicated in FIG. 2, the size of and spacing between these retainer pin holes 38 is such as to cooperate with appropriate sets of the fittings or sockets 19 of the vertical frame members 17 and 18. In this manner, by use of appropriate retainer pins, the coolant supply container 30 may be attached to the cargo container 10 when the use of the coolant supply unit is desired.

In order to refrigerate the interior of the cargo container 10, the coupling hose 25 is connected between the outlet of one of the coolant fluid bottles 31–33, for example, bottle 33, and the intake pipe of the control assembly 22. The shut-off valve 36 of the selected coolant bottle 33 is then opened to allow the flow of liquid freon or liquid nitrogen to the intake control assembly 22. The control assembly 22 passes a controlled amount of the liquid freon or liquid nitrogen into the conduit 23 and out through the holes or perforations therein and into the interior of the cargo container 10. During the process of this flow, the liquid freon or liquid nitrogen vaporizes and absorbs the heat contained in the cargo container 10. The control assembly 22 controls the rate of release of coolant fluid into the container 10 and the temperature level inside of such container 10.

This cooling process is quite rapid in nature. It has been found, for example, that the temperature inside of a ten-foot cargo container can be lowered to minus twenty degrees Fahrenheit in about ten minutes time.

If desired, an alarm system can be associated with the coolant bottles 31–33 for sounding an alarm when the pressure in the coolant bottle being used has reached the permissible lower operating limit. When this occurs, the spent bottle can be turned off and the coupling hose 25 connected to another of the coolant bottles. The shut-off valve of such other bottle is then opened to enable it to continue the refrigeration process.

Referring to FIG. 4, there is shown another manner of attaching the coolant supply container 30 to the cargo housing 16. In this case, the coolant supply container 30 is attached to the front end of the housing 16. As indicated, this is accomplished by using the appropriate sets of fittings on the vertical frame members 17 located at the forward corners of the housing 16.

If desired, the coolant supply container can also be attached to the underside of the trailer frame as is indicated for the second cargo container 11 in FIG. 1.

As is apparent, the portable cargo system of the present invention provides a relatively high degree of flexibility in the handling of cargo. The portable cargo containers can be used with or without the detachable refrigeration units in accordance with whether the goods in a particular container are of a perishable or non-perishable nature. Two or more of these portable cargo containers can readily be mounted on a single truck or trailer or railway flat car for purposes of providing a compact overall unit for transportation purposes. There is also considerable flexibility in the manner of using the detachable refrigeration units. As an example, where several of the portable cargo containers are being carried on a railway flat car, a single detachable refrigeration unit of the type indicated in FIG. 3 can be sandwiched between a pair of the cargo containers and the different coolant bottles in the refrigeration unit connected to different ones of the cargo containers. Also, a manifold arrangement can be used for the coupling hose so that a single coolant bottle can be connected to two or more of the portable cargo containers.

In addition to the flexibility feature, further advantages result from the fact that the individual cargo containers can be detached and left standing unattended at desired places of loading or delivery. In such case, if a refrigerated cargo is to be loaded or unloaded, then the detached cargo container is provided with a detachable refrigeration unit. In this manner, the detached cargo container can be loaded or unloaded at the convenience of the shipper or consignee. Also, of course, there is a considerable saving in the time of the truck driver. He does not have to wait for or be concerned with the peculiarities of the loading or unloading process.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A portable cargo system for efficiently handling either perishable or non-perishable goods comprising:
    (a) a portable sealable cargo container for enclosing the goods to be transported by truck, air, railway, boat and other means;
    (b) an intake control assembly mounted on the cargo container;
    (c) conduit means located inside the cargo container and coupled to the intake control assembly;
    (d) a portable cooling unit for detachably mounting with said container, said cooling unit being releasably coupled with said intake control assembly; and
    (e) said cooling unit including at least two fluid coolant bottles and a detachable container for holding such bottles wherein said cooling unit may be detached or connected as desired and wherein said assembly controls the temperature inside said container when said cooling unit is attached.

References Cited
UNITED STATES PATENTS

| | | | |
|---|---|---|---|
| 1,864,259 | 6/1932 | Smart | 62—237 |
| 3,269,133 | 8/1966 | Dixon | 62—51 |
| 3,281,075 | 10/1966 | Smyers | 62—64 |
| 3,287,925 | 11/1966 | Kane | 62—51 |
| 3,307,366 | 3/1967 | Smith | 62—50 |
| 3,316,726 | 5/1967 | Paulinkowis | 62—51 |
| 3,447,334 | 6/1969 | Kimball | 62—64 |

WILLIAM J. WYE, Primary Examiner

U.S. Cl. X.R.

62—50, 51, 64, 239